Strenge & Rohrer,
Horse Power.
Nº 1,586. Patented May 8. 1840.
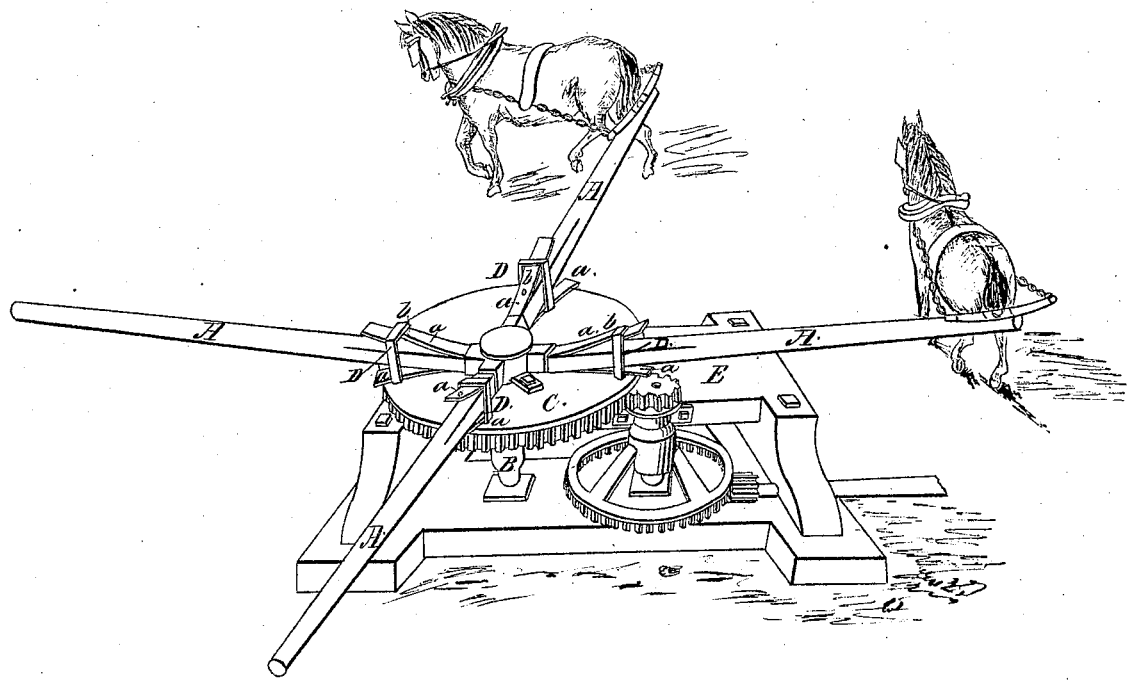

UNITED STATES PATENT OFFICE.

GEO. STRENGE AND JACOB ROHRER, OF MANHEIM TOWNSHIP, LANCASTER COUNTY, PENNSYLVANIA.

HORSE-POWER FOR DRIVING MACHINERY.

Specification of Letters Patent No. 1,586, dated May 8, 1840.

*To all whom it may concern:*

Be it known that we, GEORGE STRENGE and JACOB ROHRER, of the township of Manheim, in the county of Lancaster and State of Pennsylvania, have invented a new and useful Improvement in the Manner of Constructing Horse-Powers for the Driving of Machinery of Any Kind to Which the Same May be Applicable; and we do hereby declare that the following is a full and exact description thereof.

In the accompanying drawing A, A, are levers, or sweeps, by means of which the horses are to be made to turn the main shaft B, of the machine.

Our main improvement in the horse power consists in the manner in which we attach these levers, or sweeps, to the main driving wheel C.

Sweeps of this description have heretofore been fastened to the main shaft in such manner as not to allow of their having any vertical play, in consequence of which a considerable portion of the power of the horse, or horses has been expended without the production of any useful effect, and has, in fact been productive of injury by racking the machine. To obviate this difficulty we have adopted the following device.

We pass the sweeps A, A, through staples D, D, so formed as to confine the sweeps laterally, while they are allowed to play vertically. The inner ends of the sweeps are received within mortises in the upper end of the shaft B, and there are springs $a$, $a$, on the upper and lower sides of the rear ends of the sweeps which bear respectively upon the main driving wheel C, and upon the upper end of the staples D, D. These springs have sufficient strength to sustain the sweeps in their proper place, so as to allow them to have play up and down, their flexibility being such as to allow this effect to be produced. In the upper springs we make an offset, as at $b$, $b$, to operate as a latch in confining the sweeps in place. In consequence of our giving this vertical play to the sweeps there is not any necessity whatever for the employment of any shoulder, cap, or timber, to keep the main shaft, and the main driving wheel placed thereon from rising up when in operation; and as we place the main driving wheel above the upper timber E, of the frame which forms a collar within which said shaft runs, we can, after removing the sweeps A, A, remove the said main shaft and driving wheel, by merely lifting them up, without its being necessary to unscrew a nut, or loosen any other fixture, and the same can be replaced with the same facility, thus rendering the transportation of the machine from place to place much more easy than it would otherwise be.

Having thus fully described the manner in which we construct our improved horse power, what we claim therein as of our invention, and desire to secure by Letters Patent, is—

The allowing of a vertical play to the sweeps, or levers, by causing springs to act upon their upper and lower sides in the manner and for the purpose set forth.

GEO. STRENGE.
      JACOB ROHRER.

Witnesses:
 THOS. F. JONES,
 D. K. MORSELL.